(12) United States Patent
Wang et al.

(10) Patent No.: US 12,345,129 B2
(45) Date of Patent: Jul. 1, 2025

(54) FOAMED SQUEEZE TREATMENT IN WELLS

(71) Applicant: Saudi Arabian Oil Company, Dhahran (SA)

(72) Inventors: Qiwei Wang, Dhahran (SA); Tao Chen, Dhahran (SA); Hemant K. Sharma, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/469,079

(22) Filed: Sep. 18, 2023

(65) Prior Publication Data

US 2025/0092761 A1   Mar. 20, 2025

(51) Int. Cl.
*E21B 37/06* (2006.01)
*C09K 8/536* (2006.01)
*C09K 8/54* (2006.01)

(52) U.S. Cl.
CPC .............. *E21B 37/06* (2013.01); *C09K 8/536* (2013.01); *C09K 8/54* (2013.01)

(58) Field of Classification Search
CPC ...... E21B 43/267; E21B 37/00; E21B 36/008; E21B 43/025; E21B 43/25; C09K 8/528; C09K 2208/32; C09K 8/524; C09K 8/536
See application file for complete search history.

(56) References Cited

U.S. PATENT DOCUMENTS

| 2010/0167963 | A1 | 7/2010 | Selle et al. | |
| 2013/0341023 | A1* | 12/2013 | Krumrine, III | B08B 7/0071 166/280.1 |
| 2019/0169487 | A1* | 6/2019 | Barati Ghahfarokhi | E21B 43/164 |
| 2023/0183555 | A1* | 6/2023 | Nguyen | C09K 8/5751 507/269 |

OTHER PUBLICATIONS

Bogaert et al., "Managing Formation-Damage Risk from Scale-Inhibitor Squeeze Treatments in Deepwater, Subsea Fields in the Campos Basin," SPE Production & Operations, Nov. 2008, 23(4):468-477, 10 pages.

Bogaert et al., "Scale inhibitor Squeeze Treatments Deployed from an FPSO in Deepwater Subsea Fields in the Campos Basin," SPE-102505, SPE Annual Technical Conference & Exhibition, Sep. 24-27, 2006, San Antonio, Texas, United States, 27 pages.

(Continued)

*Primary Examiner* — Zakiya W Bates
(74) *Attorney, Agent, or Firm* — Fish & Richardson P.C.

(57) ABSTRACT

A method of treating a subterranean formation to protect against solid deposition and corrosion attack includes flowing a pre-flush fluid to a specified downhole location within the subterranean formation. A main treatment fluid is flowed to the specified downhole location. The main treatment fluid includes a scale inhibitor configured to inhibit formation of scale within the subterranean formation. At a subsurface level, an overflush foam is generated. The overflush foam includes an aqueous fluid and a gas. The overflush foam is shear thinning and non-Newtonian. The overflush foam is flowed to the specified downhole location.

20 Claims, 7 Drawing Sheets

(56) References Cited

OTHER PUBLICATIONS

Jordan et al., "The Influence of Overflush Fluid Type on Scale Squeeze Life Time—Field Examples and Placement Simulation Evaluation," NACE-08356, NACE International Corrosion 2008 Conference and Expo, Mar. 16-20, 2008, New Orleans, United States, 20 pages.

Kan et al., "The state of the art in scale inhibitor squeeze treatment," Petroleum Science, Aug. 2020, 17:1579-1601, 23 pages.

Nguyen et al., "CT Study of Liquid Diversion with Foam," SPE-93949-MS, SPE Production Operations Symposium, Oklahoma City, Oklahoma, United States, Apr. 17-19, 2005, 16 pages.

Orta et al., "A Novel Foamer for Deliquification of Condensate Loaded Well," SPE-107980-MS, SPE Rocky Mountain Oil & Gas Technology Symposium, Denver, Colorado, United States, Apr. 16-18, 2007, 5 pages.

Parlar et al., "An Experimental Study of Foam Flow Through Berea Sandstone with Applications to Foam Diversion in Matrix Acidizing," SPE-29678-MS, SPE Western Regional Meeting, Bakersfield, California, United States, Mar. 1995, 16 pages.

Raju et al., "Low Scaling Potential Horizontal Wells and Scale Inhibitor Treatment Strategy," SPE-50775-MS, Presented at the SPE International Symposium on Oil Field Chemistry, Houston, Texas, Feb. 16-19, 1998, 9 pages.

Raju et al., "Proactive Scale Mitigation Strategies for Simple to Complex Multilateral Producers in a Saudi Arabian Carbonate Field," SPE-141374-MS, Presented at the SPE Middle East Oil and Gas Show and Conference, Manama, Bahrain, Sep. 25-28, 2011, 13 pages.

Raju et al., "Scale Inhibitor Squeeze Treatments based on Modeling Studies," SPE-130280-MS, SPE International Conference on Oil Field Scale, Aberdeen, U.K., May 26-27, 2010, 10 pages.

Raju, "Successful Scale Mitigation Strategies in Saudi Arabian Oil Fields," SPE-121679-MS, SPE International Symposium on Oilfield Chemistry, The Woodlands. Texas, United States, Apr. 2009, 10 pages.

Stalker et al., "Chemical Placement in Heterogeneous and Long Reach Horizontal Wells," International Oil Field Chemistry Symposium Conference, Geilo, Norway, Mar. 2006, 17 pages.

Vazquez et al., "Modeling the Impact of Diesel vs. Water Overflush Fluids on Scale-Squeeze-Treatment Lives Using a Two-Phase Near-Wellbore Simulator," SPE Production and Operation, 2009, 24(3):473-480, 8 pages.

\* cited by examiner

200a

200b

200c

400

FOAMED SQUEEZE TREATMENT IN WELLS

TECHNICAL FIELD

This disclosure relates to squeeze treatment in wells, and in particular, for protection against solid deposition and corrosion attack.

BACKGROUND

Scaling involves formation of a deposit or coating on the surface of metal, rock, or other material located, for example, downhole in a well. Scaling can be caused by precipitation due to a chemical reaction with the surface, changes in pressure or temperature, or changes in the composition of a solution. Some typical scales found downhole include calcium carbonate, calcium sulfate, barium sulfate, strontium sulfate, iron sulfide, iron oxides, iron carbonate, silicates, phosphates, or other compounds that are insoluble or slightly soluble in water. In severe cases, scale can create a significant restriction, or even a plug, in a tubing installed in the well.

Scale inhibitors are chemicals used to control or prevent scale deposition in the production conduit or completion system. Scale inhibitors can be continuously injected through a downhole injection point in the completion, or periodic squeeze treatments can be implemented to place the inhibitor in the reservoir matrix for subsequent commingling with produced fluids. Squeeze treatments require careful application of pressure to force a treatment fluid or slurry into a planned treatment zone. In some cases, squeeze treatment is performed at downhole injection pressure below that of the formation fracture pressure. In some cases, scale inhibitor treatment is integrated with fracture treatment.

SUMMARY

This disclosure describes technologies relating to squeeze treatment of subterranean formations for protection against solid deposition and corrosion attack, and in particular for control of inorganic scale. A foamed composition is injected for overflush in place of a diesel-based composition for low pressure and/or heterogeneous wells. The foamed composition includes water, nitrogen gas, and a foaming agent surfactant. The foamed composition is a non-Newtonian fluid in which viscosity of the fluid decreases with shear rate (shear thinning). The preflush and main treatment pill can also be foamed to improve placement of the scale inhibitor. The foamed composition can be injected into the formation via a pump as opposed to coiled tubing, which can be costly.

Certain aspects of the subject matter can be implemented as a method of treating a subterranean formation to protect against solid deposition and corrosion attack. The method includes flowing a first aqueous fluid as a pre-flush into a wellbore formed in the subterranean formation via a tubing installed in the wellbore. The method includes, while flowing the first aqueous fluid, flowing a first gas together with the first aqueous fluid into the wellbore via the tubing. Flowing the first gas together with the first aqueous fluid via the tubing produces turbulent flow of the first gas and the first aqueous fluid within the tubing, thereby generating a pre-flush foam that is shear thinning and non-Newtonian and flows to a specified downhole location within the subterranean formation. The method includes, after flowing the pre-flush foam to the specified downhole location, flowing a second aqueous fluid as a main treatment pill into the wellbore via the tubing. The method includes, while flowing the second aqueous fluid, flowing a second gas together with the second aqueous fluid into the wellbore via the tubing. Flowing the second gas together with the second aqueous fluid via the tubing produces turbulent flow of the second gas and the second aqueous fluid within the tubing, thereby generating a main treatment foam that is shear thinning and non-Newtonian and flows to the specified downhole location. The second aqueous fluid comprises a scale inhibitor configured to inhibit formation of scale within the subterranean formation. The method includes, after flowing the main treatment foam to the specified downhole location, flowing a third aqueous fluid as an overflush into the wellbore via the tubing. The method includes, while flowing the third aqueous fluid, flowing a third gas together with the third aqueous fluid into the wellbore, via the tubing. Flowing the third gas together with the third aqueous fluid via the tubing produces turbulent flow of the third gas and the third aqueous fluid within the tubing, thereby generating an overflush foam that is shear thinning and non-Newtonian and flows to the specified downhole location.

This, and other aspects, can include one or more of the following features. In some implementations, the first gas, the second gas, and the third gas each comprise nitrogen, carbon dioxide, or both. In some implementations, the first aqueous fluid, the second aqueous fluid, and the third aqueous fluid each comprise a foaming agent comprising sodium alpha olefin sulfonate, ethoxylated alcohol ammonium sulfate, sodium dodecylbenzene sulfonate, sodium dioctyl sulfosuccinate, sodium dodecylaminodipropionate, sodium lauryl sulfoacetate, hexadecyltrimethyl ammonium chloride, polyethoxylated nonyl phenol, alkyl polyglycoside, cocoamidopropyl betaine, sodium perfluoroalkyl sulfonate, cocoamidopropyl hydroxysultaine, or any combinations of these. In some implementations, the pre-flush foam, the main treatment foam, and the overflush foam each have foam qualities in a range of from about 25% to about 80% at ambient conditions. In some implementations, the pre-flush foam, the main treatment foam, and the overflush foam each have foam qualities in a range of from about 50% to about 75% at ambient conditions. In some implementations, the first aqueous fluid comprises the scale inhibitor at a concentration in a range of from about 500 parts per million (ppm) to about 2,000 ppm, and a concentration of the foaming agent in the first aqueous fluid is in a range of from about 0.5 volume percent (vol. %) to about 2 vol. %. In some implementations, the first aqueous fluid comprises a mutual solvent that is soluble in water and in oil, and a concentration of the mutual solvent in the first aqueous fluid is in a range of from about 5 vol. % to about 10 vol. %. In some implementations, the third aqueous fluid comprises salt, and a total dissolved solids (TDS) concentration in the third aqueous fluid is in a range of from about 1,000 ppm to about 12,000 ppm. In some implementations, a concentration of the foaming agent in the second aqueous fluid is in a range of from about 1 vol. % to about 50 vol. %. In some implementations, the concentration of the foaming agent in the second aqueous fluid is in a range of from about 5 vol. % to about 15 vol. %.

Certain aspects of the subject matter can be implemented as a method of treating a subterranean formation to protect against solid deposition and corrosion attack. The method includes generating, at a subsurface level, a pre-flush foam comprising a first aqueous fluid and a first gas. The pre-flush foam is shear thinning and non-Newtonian. The method includes flowing the pre-flush foam to a specified downhole location within the subterranean formation. The method includes generating, at the subsurface level, a main treatment foam comprising a second aqueous fluid and a second gas. The second aqueous fluid comprises a scale inhibitor configured to inhibit formation of scale within the subterranean formation. The main treatment foam is shear thinning and non-Newtonian. The method includes flowing the main treatment foam to the specified downhole location. The method includes generating, at the subsurface level, an overflush foam comprising a third aqueous fluid and a third gas. The overflush foam is shear thinning and non-Newtonian. The method includes flowing the overflush foam to the specified downhole location.

This, and other aspects, can include one or more of the following features. In some implementations, the first gas, the second gas, and the third gas each comprise nitrogen, carbon dioxide, or both. In some implementations, the first aqueous fluid, the second aqueous fluid, and the third aqueous fluid each comprise a foaming agent comprising sodium alpha olefin sulfonate, ethoxylated alcohol ammonium sulfate, sodium dodecylbenzene sulfonate, sodium dioctyl sulfosuccinate, sodium dodecylaminodipropionate, sodium lauryl sulfoacetate, hexadecyltrimethyl ammonium chloride, polyethoxylated nonyl phenol, alkyl polyglycoside, cocoamidopropyl betaine, sodium perfluoroalkyl sulfonate, cocoamidopropyl hydroxysultaine, or any combinations of these. In some implementations, the pre-flush foam, the main treatment foam, and the overflush foam each have foam qualities in a range of from about 25% to about 80% at ambient conditions. In some implementations, the pre-flush foam, the main treatment foam, and the overflush foam each have foam qualities in a range of from about 50% to about 75% at ambient conditions. In some implementations, the first aqueous fluid comprises the scale inhibitor at a concentration in a range of from about 500 parts per million (ppm) to about 2,000 ppm, and a concentration of the foaming agent in the first aqueous fluid is in a range of from about 0.5 volume percent (vol. %) to about 2 vol. %. In some implementations, the first aqueous fluid comprises a mutual solvent that is soluble in water and in oil, and a concentration of the mutual solvent in the first aqueous fluid is in a range of from about 5 vol. % to about 10 vol. %. In some implementations, the third aqueous fluid comprises salt, and a total dissolved solids (TDS) concentration in the third aqueous fluid is in a range of from about 1,000 ppm to about 12,000 ppm. In some implementations, a concentration of the foaming agent in the second aqueous fluid is in a range of from about 1 vol. % to about 50 vol. %.

Certain aspects of the subject matter can be implemented as a method of treating a subterranean formation to protect against solid deposition and corrosion attack. The method includes flowing a pre-flush fluid to a specified downhole location within the subterranean formation. The method includes flowing a main treatment fluid to the specified downhole location. The main treatment fluid comprises a scale inhibitor configured to inhibit formation of scale within the subterranean formation. The method includes generating, at a subsurface level, an overflush foam comprising an aqueous fluid and a gas. The overflush foam is shear thinning and non-Newtonian. The method includes flowing the overflush foam to the specified downhole location.

The subject matter described in this disclosure can be implemented in particular implementations, so as to realize one or more of the following advantages. The described methods include injection of shear thinning and non-Newtonian foam into subterranean formations for squeeze treatment. The shear thinning and non-Newtonian foam used in the squeeze treatment allow for accurate placement of the foams within the subterranean formation, such that the squeeze treatment is effective and treats the desired locations within the subterranean formation, even in heterogeneous wells. The shear thinning and non-Newtonian foam can replace diesel as overflush fluid in the squeeze treatment. Replacing diesel as overflush fluid in the squeeze treatment can have various advantages because diesel can affect wettability within the subterranean formation (for example, near the wellbore), can have a short squeeze life, which makes scale inhibitor penetration into the subterranean formation difficult, and can induce asphaltene deposition within the subterranean formation (for example, near the wellbore), which can result in damage to the subterranean formation and reduce productivity of the well. The described methods can mitigate and/or prevent formation of scale and corrosion attack on tubings installed in low pressure wells, heterogeneous wells, or both. Low pressure wells typically have a reservoir support pressure less than about 0.43 pounds per square inch per food (psi/ft) and have a bottomhole pressure that is not sufficient to lift wellbore fluid from downhole to the surface and to a gas-oil separation plant (GOSP), especially when heavier fluids (such as aqueous scale inhibitor) has been pumped into the reservoir during squeeze treatment. Heterogeneous wells have low permeability zones (zones having a permeability of less than about 30 milli-Darcy (mD)) and high permeability zones (zones having a permeability of greater than about 300 mD, and sometimes as high as 1,000 mD). The described methods reduce squeeze treatment times, which in turn reduces downtime that prevents production from the well. The described methods can mitigate and/or eliminate the use of excess scale inhibitor well over the minimum effective concentration (MEC), which can reduce costs. The described methods can improve penetration of fluids used in squeeze treatments into the subterranean formation that are farther and/or deeper in the subterranean formation, even in zones of the subterranean formation in which permeability is decreased. The described methods allow for squeeze treatments to be completed in low pressure wells without requiring the use of coiled tubing, which can be expensive and is typically required for conventional squeeze treatments in low pressure wells. The described methods allow for production of fluids from the well directly after the squeeze treatment is completed, even in low pressure wells. The described methods allow for extended squeeze life of squeeze treatments, which can reduce the number of times squeeze treatments need to be performed, which can save on both capital and operating costs and also reduce production downtime. The described methods can reduce chemical consumption (capital cost savings) and also lead to a smaller carbon footprint.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes squeeze treatment of subterranean formations for protection against solid deposition and corrosion attack, and in particular for control of inorganic scale. A foamed composition is injected for overflush in place of a diesel-based composition for low pressure and/or heterogeneous wells. The foamed composition includes water, nitrogen gas, and a foaming agent surfactant. The foamed composition is a non-Newtonian fluid in which viscosity of the fluid decreases with shear rate (shear thinning). Pre-flush and main treatment pill can also be foamed to improve placement of the scale inhibitor. The foamed composition can be injected into the formation via a pump as opposed to coiled tubing, which can be costly.

Figure 1:
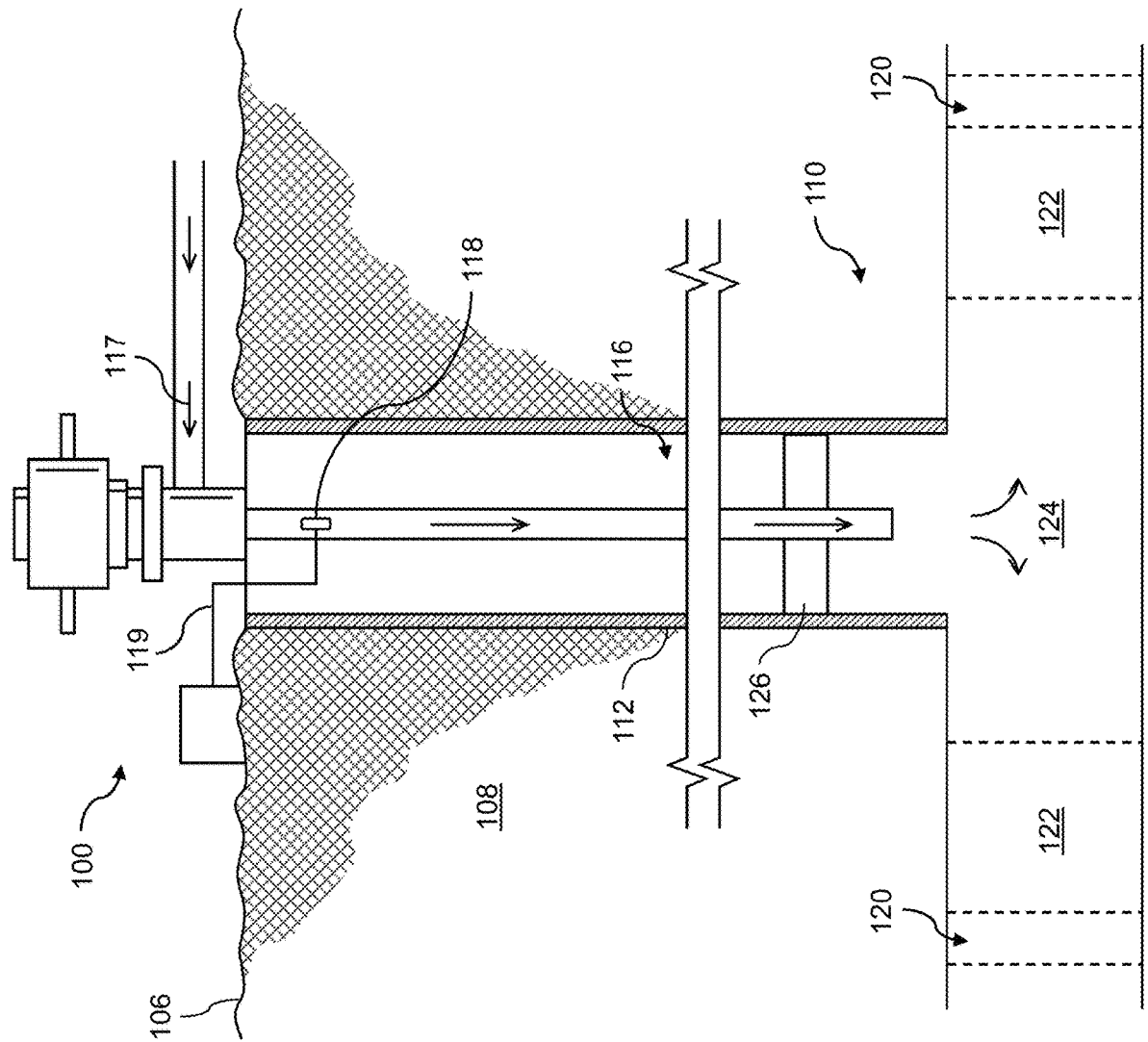
FIG. 1 is a schematic diagram of an example well.

FIG. 1 depicts an example well 100 that extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some cases, the well 100 is treated with a squeeze treatment to mitigate and/or prevent solid deposition and corrosion attack within the well 100. The squeeze treatment include a pre-flush stage, a main treatment stage, and an overflush stage. The pre-flush stage is to prep the well 100 for the main treatment stage. The main treatment stage includes flowing a corrosion and/or scale inhibitor into the well 100. The corrosion and/or scale inhibitor protects the well against solid deposition and corrosion attack. The overflush stage displaces the corrosion and/or scale inhibitor away from the wellbore at the conclusion of the squeeze treatment. At least the overflush stage of the squeeze treatment includes injection of a foamed non-Newtonian fluid, which replaces the conventional use of diesel. In some implementations, the pre-flush stage also includes injection of a foamed non-Newtonian fluid. In some implementations, the main treatment stage also includes injection of a foamed non-Newtonian fluid.

In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a deviated well, but in other instances, the well 100 can be a vertical well or the well 100 can include multiple bores forming a multilateral well (that is, a well having multiple lateral wells branching off another well or wells). The well 100 can be, for example, a low pressure well, a heterogeneous well, or both. For example, the well 100 is a low pressure well that includes areas having generally different permeabilities.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached to the wellhead. The Christmas tree includes valves used to regulate flow into or out of the well 100. In particular, casing 112 is commercially produced in a number of common sizes specified by the American Petroleum Institute (the "API"), including 4-½, 5, 5-½, 6, 6-⅝, 7, 7-⅝, 7-¾, 8-⅝, 8-¾, 9-⅝, 9-¾, 9-⅞, 10-¾, 11-¾, 11-⅞, 13-⅜, 13-½, 13-⅝, 16, 18-⅝, and 20 inches, and the API specifies internal diameters for each casing size.

A seal system 126 integrated or provided separately with a downhole system, such as a downhole pump, divides the well 100 into an uphole zone above the seal system 126 and a downhole zone below the seal system 126. In some implementations, a downhole pump is positioned in the open volume of the bore 116 of the casing 112, and connected to a production string of tubing (also referred as production tubing 128) in the well 100. The wall of the well 100 includes the interior wall of the casing 112 in portions of the wellbore having the casing 112, and includes the open hole wellbore wall in uncased portions of the well 100. Thus, the seal system 126 is configured to seal against the wall of the wellbore, for example, against the interior wall of the casing 112 in the cased portions of the well 100 or against the interior wall of the wellbore in the uncased, open hole portions of the well 100. The seal system 126 forms a gas- and liquid-tight seal at the pressure differential within the well 100. For example, the seal system 126 can be configured to at least partially seal against an interior wall of the wellbore to separate (completely or substantially) a pressure in the well 100 downhole of the seal system 126 from a pressure in the well 100 uphole of the seal system 126.

During a squeeze treatment, liquid 117 and gas 119 can be flowed together into the well 100. As the liquid 117 and gas 119 flow together downhole into the well 100, a foam is generated. Generation of the foam can be facilitated by flowing the liquid 117 and gas 119 in a turbulent flow regime. Flow of fluid (for example, the mixture of liquid 117 and gas 119) in the turbulent flow regime is characterized by non-parallel streamlines, a high rate of lateral mixing, layer disruption, and chaotic changes in fluid properties. The turbulent flow regime can, for example, be characterized by a Reynolds number of about 3,500 or greater, or about 4,000 or greater. In some implementations, the well 100 includes a flow restriction 118 that promotes generation of turbulent flow (for example, within the tubing within which the liquid 117 and gas 119 are flowed together into the subterranean formation), thereby promoting generation of the foam. Flowing the gas 119 into the well 100 via the flow restriction 118 can reduce the size of bubbles of the gas 119 in the liquid 117, which can promote turbulence in the flow of the liquid 117 and gas 119 and generate the foam. The flow restriction 118 can, for example, be an orifice or a Venturi tube. The foam generated (including the liquid 117 and gas 119) is a shear thinning and non-Newtonian. The gas 119 can include nitrogen, carbon dioxide, produced gas (that is, gas produced from the well 100), or any combinations of these. The liquid 117 can include a foaming agent (such as a surfactant) that facilitates the generation of the foam. The foaming agent can be cationic, anionic, amphoteric, or non-ionic. The foaming agent can include sodium alpha olefin sulfonate, ethoxylated alcohol ammonium sulfate, sodium dodecylbenzene sulfonate, sodium dioctyl sulfosuccinate, sodium dodecylaminodipropionate, sodium lauryl sulfoacetate, hexadecyltrimethyl ammonium chloride, polyethoxylated nonyl phenol, alkyl polyglycoside, cocoamidopropyl betaine, sodium perfluoroalkyl sulfonate, cocoamidopropyl hydroxysultaine, or any combinations of these.

The composition of the liquid 117, the gas 119, or both can be adjusted based on the desired characteristics of the treatment fluid (non-Newtonian foam) being delivered into the subterranean formation. For example, a squeeze treatment can include injection of a pre-flush foam 120, followed by a main treatment foam 122, and followed by an overflush foam 124. In some implementations, the pre-flush fluid 120 includes a first aqueous fluid. In some implementations, the pre-flush fluid 120 is a foam that includes the first aqueous fluid and a first gas. In such cases, the pre-flush fluid 120 can be referred to as pre-flush foam. The first aqueous fluid of the pre-flush foam 120 is an implementation of the liquid 117, and the first gas of the pre-flush foam 120 is an implementation of the gas 119. In some implementations, the main treatment fluid 122 includes a second aqueous fluid. In some implementations, the main treatment fluid 122 is a foam that includes the second aqueous fluid and a second gas. In such cases, the main treatment fluid 122 can be referred to as main treatment foam. The second aqueous fluid of the main treatment foam 122 is an implementation of the liquid 117, and the second gas of the main treatment foam 122 is an implementation of the gas 119. The overflush foam 120 is a mixture of a third aqueous fluid and a third gas. The third aqueous fluid of the overflush foam 124 is an implementation of the liquid 117, and the third gas of the overflush foam 124 is an implementation of the gas 119. As mentioned previously, the overflush foam 124 can replace the conventional use of diesel in squeeze treatment, which can result in decreased downtime and allow for production to resume more quickly.

The pre-flush foam 120, main treatment foam 122, and overflush foam 124 can each have foam qualities in a range of from about 25% to about 80% at ambient conditions (for example, 1 atmosphere and about 20 degrees Celsius (° C.)). Foam quality is the ratio of gas volume to foam volume (gas and liquid) at a given pressure and temperature. The foam quality of the pre-flush foam 120, main treatment foam 122, and overflush foam 124 can be tested, for example, at the surface (such as in a lab) at ambient conditions. For example, the pre-flush foam 120 can have a foam quality in a range of from about 50% to about 75% at ambient conditions. For example, the main treatment foam 122 can have a foam quality in a range of from about 50% to about 75% at ambient conditions. For example, the overflush foam 124 can have a foam quality in a range of from about 50% to about 75% at ambient conditions. The selection and concentration of the foaming agent included in each of the pre-flush foam 120, main treatment foam 122, and overflush foam 124 based on desired characteristics of the respective foam. For example, the foaming agent and its concentration can be selected to improve strength (stability) of the foam. Strength (stability) of the pre-flush foam 120, main treatment foam 122, and overflush foam 124 can be determined, for example, by measuring the respective foam's half-life, which is defined as time duration it takes for a foam to decrease in volume by half (50%) from its original volume at static conditions (for example, ambient conditions). A longer half-life correlates to a stronger (more stable) foam. Having a longer half-life can ensure that the treatment foam (whether it be the pre-flush foam 120, main treatment foam 122, or overflush foam 124) will remain stable during placement of the foam into the subterranean formation during the squeeze treatment.

In some implementations, the first aqueous fluid of the pre-flush foam 120 includes a scale inhibitor. The scale inhibitor includes a chemical that mitigates and/or prevents scale deposition in the production conduit and/or completion system of the well 100. The scale inhibitor can include organophosphorus or polymeric compounds. Some non-limiting examples of scale inhibitor include aminotris(methylphosphonic acid) (ATMP), lethane-1,2-diphosphonic acid (EDPA), diethylenetriaminepenta (methylenephosphonic acid) (DETPMP), tris(phosphonomethyl) amine, nitrilotrimethylphosphonic acid, bis(hexamethylenetriaminepenta (methylenephosphonic acid)) (BHTMP), 1-hydroxyethylidene-1,1-diphosphonic acid (HEDP), polyamino polyether methylene phosphonae (PAPEMP), [[(2-hydroxyethyl) imino]bis(methylene)]bisphosphonic acid (MEA/HADMP), 2-phosphono-butane-1, 2, 4-tricarboxylic acid (PBTC), polyacrylic acid (PAA), polymaleic acid (PMA), polyphosphinocarboxylic acid (PPCA), polyvinyl sulfonate and polyacrylic acid copolymer (PVS), phosphonocarboxylic acid (POCA), and polyaspartate. The scale inhibitor delays scale nucleation, retards scale crystal growth, changes the shape of the scale crystal, prevents adhesion of scale to equipment surfaces, or any combinations of these.

The first aqueous fluid of the pre-flush foam 120 can include the scale inhibitor at a concentration in a range of from about 500 parts per million (ppm) to about 2,000 ppm. In some implementations, the first aqueous fluid of the pre-flush foam 120 includes the foaming agent (surfactant) at a concentration in a range of from about 0.5 volume percent (vol. %) to about 2 vol. % or from about 0.5 vol. % to about 1.5 vol. %. In some implementations, the first aqueous fluid of the pre-flush foam 120 includes a mutual solvent that is soluble in both oil and water. For example, the mutual solvent can include ethylene glycol monobutyl ether (EGMBE), diethylene glycol monoethyl ether (DEGEE), diethylene glycol butyl ether (DGBE), triethylene glycol monoethyl ether (also called triglyme), or any combinations of these. The first aqueous fluid of the pre-flush foam 120 can include the mutual solvent at a concentration in a range of from about 5 vol. % to about 10 vol. %. In some implementations, the first aqueous fluid of the pre-flush foam 120 includes a demulsifying agent. The demulsifying agent can include a surface-active compound with high hydrophilic-lipophilic balance (HLB) values. The demulsifying agent can include, for example, ethylene oxides, ethoxylated resins, sulphonic acid salts, or any combinations of these. The first aqueous fluid of the pre-flush foam 120 can include the demulsifying agent at a concentration in a range of from about 0.25 vol. % to about 2 vol. %.

The second aqueous fluid of the main treatment foam 122 includes the scale inhibitor. The second aqueous fluid of the main treatment foam 122 can include the scale inhibitor at a concentration in a range of from about 1 vol. % to about 50 vol. % or from about 5 vol. % to about 15 vol. %. The third aqueous fluid of the overflush foam 124 can include brine. For example, the third aqueous fluid of the overflush foam 124 can include a salt solution synthetically produced or produced water from a well. The third aqueous fluid of the overflush foam 124 can include dissolved solids (such as dissolved salt). In some implementations, the third aqueous fluid of the overflush foam 124 has a total dissolved solids (TDS) concentration in a range of from about 1,000 ppm to about 12,000 ppm. Table 1 provides three example compositions of the third aqueous fluid of the overflush foam 124.

TABLE 1

Example compositions of third aqueous fluid of overflush foam

| Component (ppm) | Example 1 | Example 2 | Example 3 |
|---|---|---|---|
| Sodium | 196 | 1,285 | 3,048 |
| Potassium | 12 | 43 | 88 |
| Calcium | 136 | 720 | 949 |
| Magnesium | 50 | 139 | 126 |
| Barium | 0.2 | <0.5 | <0.5 |
| Strontium | 1.8 | 3 | 26 |
| Bicarbonate | 197 | 206 | 133 |
| Sulfate | 270 | 460 | 1,097 |
| Chloride | 375 | 3,940 | 6,387 |
| TDS | 1,224 | 5,700 | 11,850 |

The amounts of pre-flush foam 120, main treatment foam 122, and overflush foam 124 injected into the well 100 can be individually adjusted based on characteristics of the well 100, the subterranean formation that is being treated, and area of the zone of the subterranean formation that is to be treated. For example, the amount of main treatment foam 122 injected into the well 100 can be increased for long, horizontal wells.

Figure 2A:
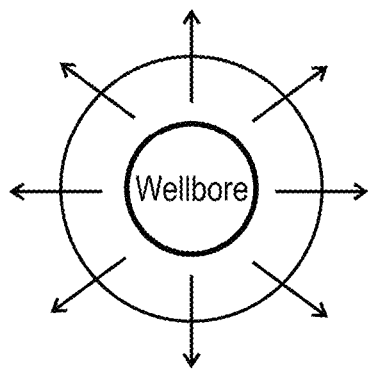
FIG. 2A is a cross-sectional view illustrating the permeation of a treatment fluid flowed into a well.
Figure 2B:
FIG. 2B is a graph that shows an example relationship between flow rate of a treatment fluid flowed into a well and distance from the wellbore.
Figure 2C:
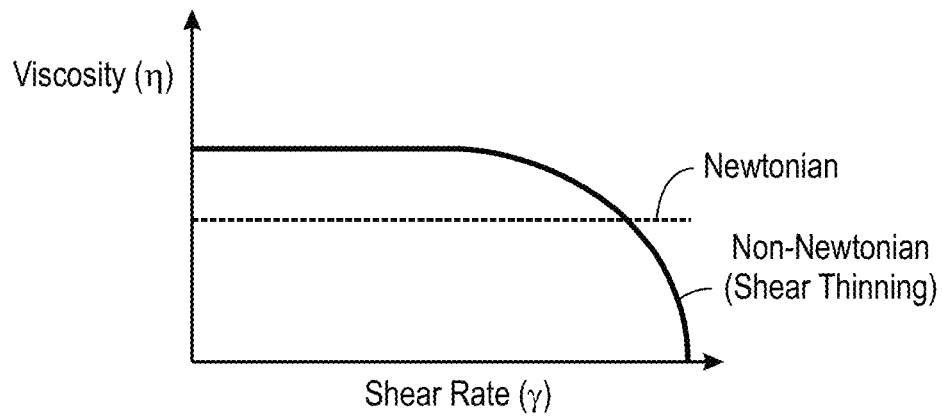
FIG. 2C is a graph that compares behavior of a Newtonian fluid and a non-Newtonian fluid in response to shear.

FIG. 2A is a cross-sectional view 200a illustrating and example of the permeation of a treatment fluid (for example, any of the pre-flush foam 120, main treatment foam 122, or overflush foam 124) flowed into a well (such as the well 100). As shown in cross-sectional view 200a, the treatment fluid can spread radially outward from the wellbore and penetrate into the subterranean formation. FIG. 2B is a graph 200b that shows an example relationship between flow rate of a treatment fluid (for example, any of the pre-flush foam 120, main treatment foam 122, or overflush foam 124) flowed into a well (such as the well 100) and distance from the wellbore. As shown in graph 200b, the flow rate of the treatment fluid decreases as the treatment fluid flows penetrates into the subterranean formation, farther away from the wellbore. FIG. 2C is a graph 200c that compares behavior of a Newtonian fluid and a non-Newtonian (shear thinning) fluid in response to shear. As shown in graph 200c, the viscosity of the Newtonian fluid remains the same regardless of any changes in shear rate, and the viscosity of the shear thinning, non-Newtonian fluid generally decreases as shear rate increases. The pre-flush foam 120, main treatment foam 122, and overflush foam 124 are shear thinning, non-Newtonian fluids and exhibit similar behavior to the shear thinning, non-Newtonian fluid shown in graph 200c.

Figure 3:
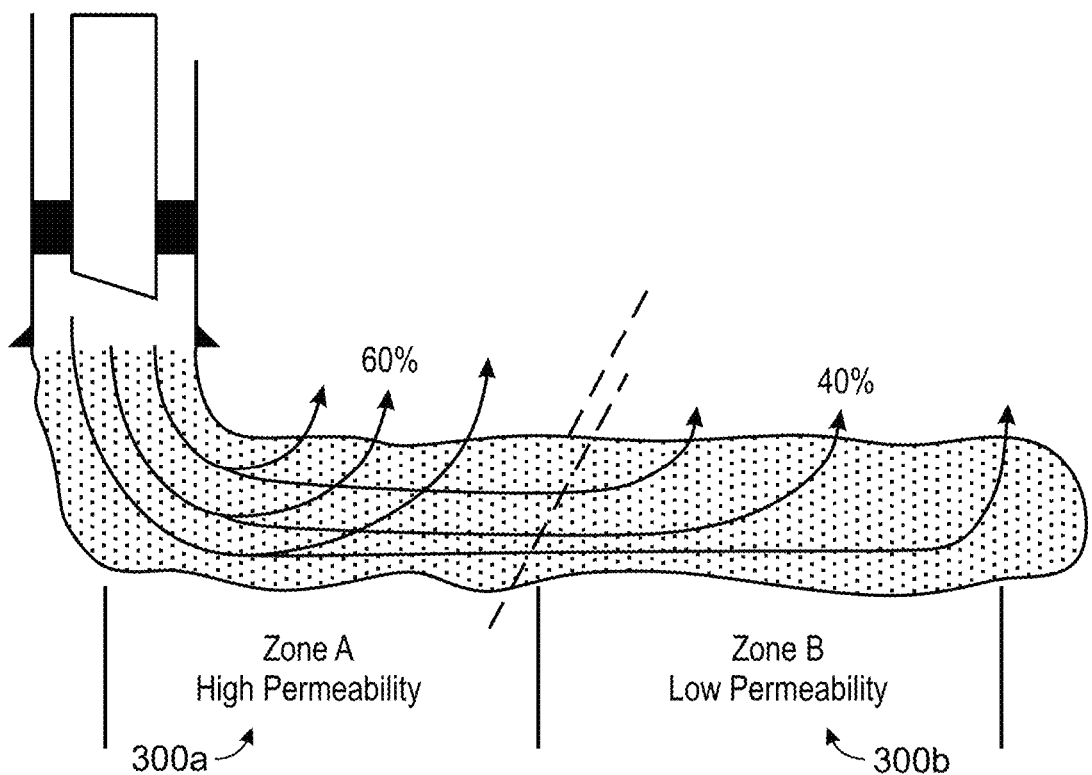
FIG. 3 is a schematic diagram illustrating distribution of a treatment fluid flowed into a heterogeneous well.

FIG. 3 is a schematic diagram illustrating distribution of a treatment fluid (for example, the main treatment foam 122) flowed into a heterogeneous well 300. Because the main treatment foam 122 is a foamed, non-Newtonian fluid, the main treatment foam 122 can penetrate further into the well 300 in comparison to conventional treatment fluids that are not foamed and/or are Newtonian. The main treatment foam 122 (along with the pre-flush foam 120 and the overflush foam 124) can penetrate deeper and further into the well 100 because of its shear-thinning property.

Figure 4:
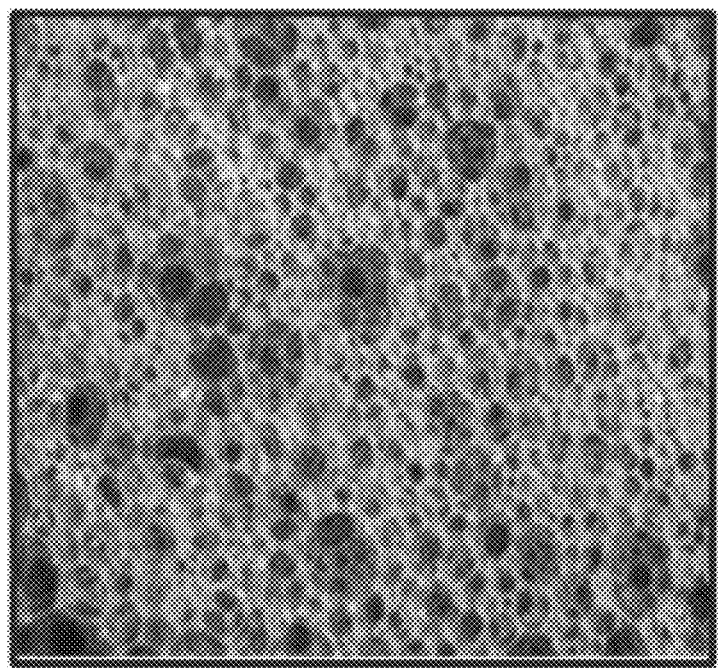
FIG. 4 is a photograph of an example foam including water, surfactant, and nitrogen gas.

The well 300 is a horizontal well. The well 300 has a first zone 300a and a second zone 300b of different permeabilities. Permeability is a measurement of the ability of a rock (such as the subterranean formation) to transmit fluids. Permeability can, for example, be measured in darcies or millidarcies. The first zone 300a has a greater permeability in comparison to the second zone 300b. For example, the first zone 300a has a permeability greater than about 100 mD or greater than about 500 mD. For example, the second zone 300b has a permeability less than about 100 mD or less than about 30 mD. Because the first zone 300a has a greater permeability in comparison to the second zone 300b, the main treatment foam 122 may distribute unevenly among the first and second zones 300a, 300b. A greater portion of the main treatment foam 122 penetrates into the subterranean formation through the first zone 300a in comparison to the second zone 300b. In cases in which the main treatment pill is a Newtonian fluid, most (for example, more than about 75%) of the main treatment pill would permeate into the subterranean formation through the first zone 300a while only a small portion (for example, less than 25%) of the main treatment pill would permeate into the subterranean formation through the second zone 300b. However, because the main treatment foam 122 is a shear thinning, non-Newtonian fluid, the viscosity of the main treatment foam 122 increases as the velocity (flow rate) of the main treatment foam 122 decreases (refer to graphs 200b and 200c of FIGS. 2B and 2C, respectively). Thus, some of the main treatment foam 122 may flow farther along the wellbore and be diverted to the second zone 300b of decreased permeability. For example, about 50% of the main treatment foam 122 penetrates into the subterranean formation through the first zone 300a, while a remaining portion (about 40%) of the main treatment foam 122 penetrates into the subterranean formation through the second zone 300b. Because the main treatment foam 122 is a shear thinning, non-Newtonian fluid, the main treatment foam 122 can penetrate more evenly into the subterranean formation in comparison to conventional pills that behave as Newtonian fluids. FIG. 4 is a photograph of an example foam 400 including water, surfactant, and nitrogen gas.

An experiment was conducted studying the effect of concentration of foaming agent in the resulting foam. The concentrations of foaming agent tested were 0.25 vol. %, 0.5 vol. %, 0.75 vol. %, and 1.0 vol. %. Table 2 provides summarized results of the experiment. Original foam volume for each test sample was measured in milliliters (mL). Half-life for each test sample was measured in minutes (min). It was found that increasing the concentration of foaming agent resulted in a longer half-life, indicating a stronger (more stable) foam.

TABLE 2

Experiment on effect of concentration of foaming agent on foam's half-life

| | Concentration of foaming agent (vol. %) | | | |
| --- | --- | --- | --- | --- |
| | 0.25 | 0.5 | 0.75 | 1.0 |
| Original foam volume (mL) | 425 | 600 | 780 | 900 |
| Half-life (min) | 2.7 | 5.2 | 7.3 | 9.2 |

Figure 5:
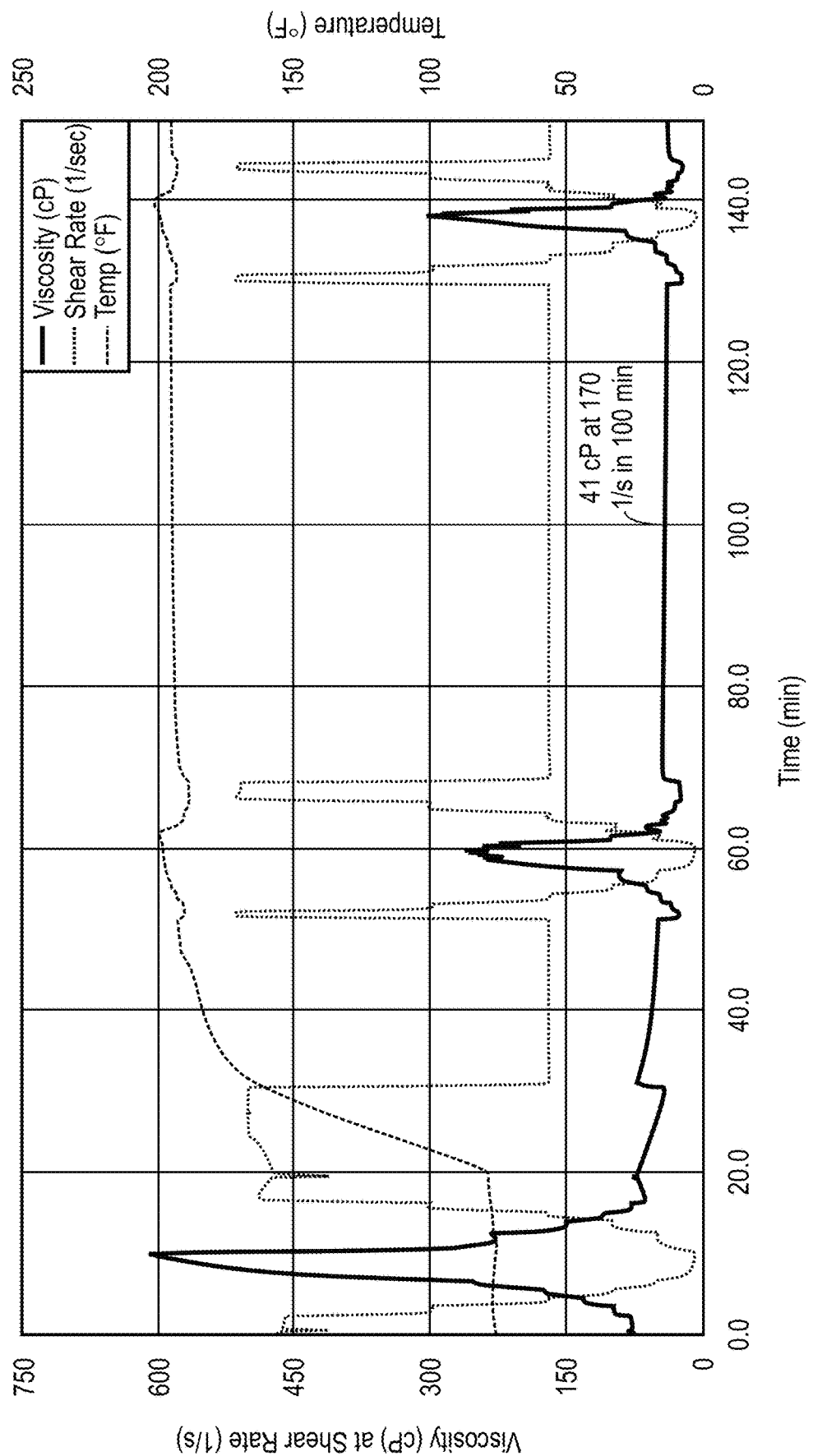
FIG. 5 is a graph that shows viscosity, shear rate, and temperature of an example treatment fluid during an experiment.

FIG. 5 is a graph 500 that shows viscosity, shear rate, and temperature of an example treatment foam during an experiment. The treatment foam studied was a shear thinning, non-Newtonian fluid (similar to the pre-flush foam 120, main treatment foam 122, and overflush foam 124). Foam stability and viscosity of the treatment foam were measured using a foam rheometer (Chandler Model 8500) at an applied pressure of 1,000 psi and at varying temperatures, mainly at 75 degrees Fahrenheit (° F.) with peaks of 195° F. for simulating surface and downhole conditions. Shear rate was varied (10, 50, 100, 170, and 500 reciprocal seconds ($s^{-1}$)) during the experiment to study the effect of shear on viscosity of the treatment foam. The first shear sweep was performed at 75° F. The second and third shear sweeps were performed at 195° F. All three shear sweeps exhibited shear thinning behavior, in which viscosity increased as shear rate decreased (and viscosity decreased as shear rate increased). Between the second and third sweeps (from 70 minutes to 130 minutes), viscosity of the treatment foam remained relatively the same, indicating that the treatment foam was stable. Stability of the treatment foam was also visually confirmed.

Figure 6:
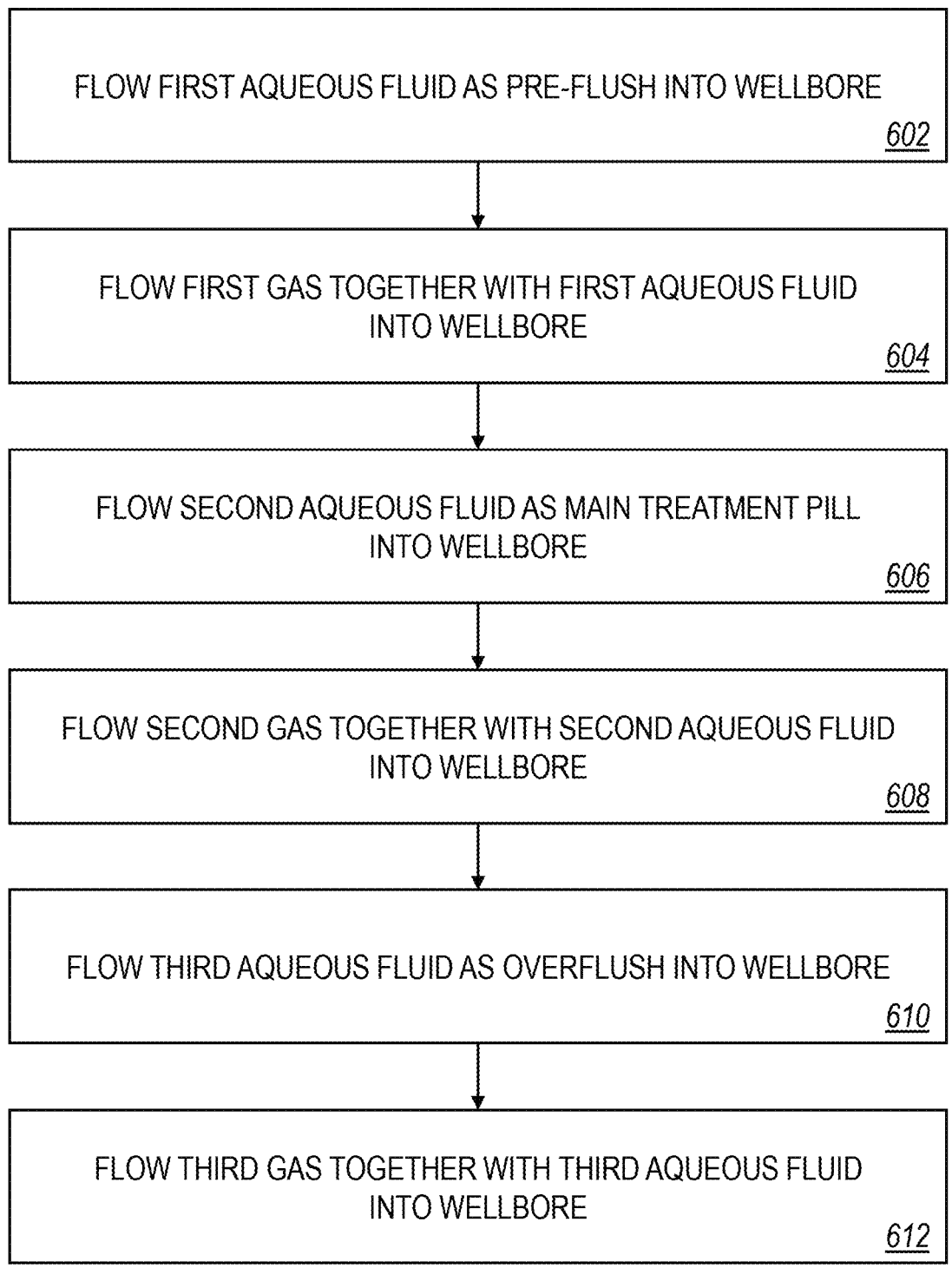
FIG. 6 is a flow chart of an example method for treating a subterranean formation.

FIG. 6 is a flow chart of an example method 600 for treating a subterranean formation to protect against solid deposition and corrosion attack. The method 600 can, for example, be implemented in the well 100 shown in FIG. 1. At block 602, a first aqueous fluid is flowed as pre-flush into a wellbore formed in a subterranean formation (such as the wellbore of the well 100). The first aqueous fluid can be flowed into the wellbore at block 602, for example, via a production tubing installed in the wellbore. While flowing the first aqueous fluid into the wellbore at block 602, a first gas is flowed together with the first aqueous fluid into the wellbore via the production tubing at block 604. The first gas can be flowed into the wellbore at block 604, for example, via the flow restriction 118. Flowing the first gas together with the first aqueous fluid via the tubing at block 604 produces turbulent flow of the first gas and the first aqueous fluid within the tubing, thereby generating a pre-flush foam (such as the pre-flush foam 120) that is shear thinning and non-Newtonian. The pre-flush foam 120 flows to a specified downhole location (treatment zone) within the subterranean formation. After flowing the pre-flush foam 120 to the specified downhole location, a second aqueous fluid is flowed as a main treatment pill into the wellbore via the tubing at block 606. While flowing the second aqueous fluid into the wellbore at block 606, a second gas is flowed together with the second aqueous fluid into the wellbore via the production tubing at block 608. The second gas can be flowed into the wellbore at block 608, for example, via the flow restriction 118. Flowing the second gas together with the second aqueous fluid via the tubing at block 608 produces turbulent flow of the second gas and the second aqueous fluid within the tubing, thereby generating a main treatment foam (such as the main treatment foam 122) that is shear thinning and non-Newtonian. The main treatment foam 122 flows to a specified downhole location (treatment zone) within the subterranean formation. As mentioned previously, the main treatment foam 122 includes a scale inhibitor that is configured to inhibit formation of scale within the subterranean formation. After flowing the main treatment foam 122 to the specified downhole location, a third aqueous fluid is flowed as an overflush into the wellbore via the tubing at block 610. While flowing the third aqueous fluid into the wellbore at block 610, a third gas is flowed together with the third aqueous fluid into the wellbore via the production tubing at block 612. The third gas can be flowed into the wellbore at block 612, for example, via the flow restriction 118. Flowing the third gas together with the third aqueous fluid via the tubing at block 612 produces turbulent flow of the third gas and the third aqueous fluid within the tubing, thereby generating an overflush foam (such as the overflush foam 124) that is shear thinning and non-Newtonian. The overflush foam 124 flows to a specified downhole location (treatment zone) within the subterranean formation.

Figure 7:
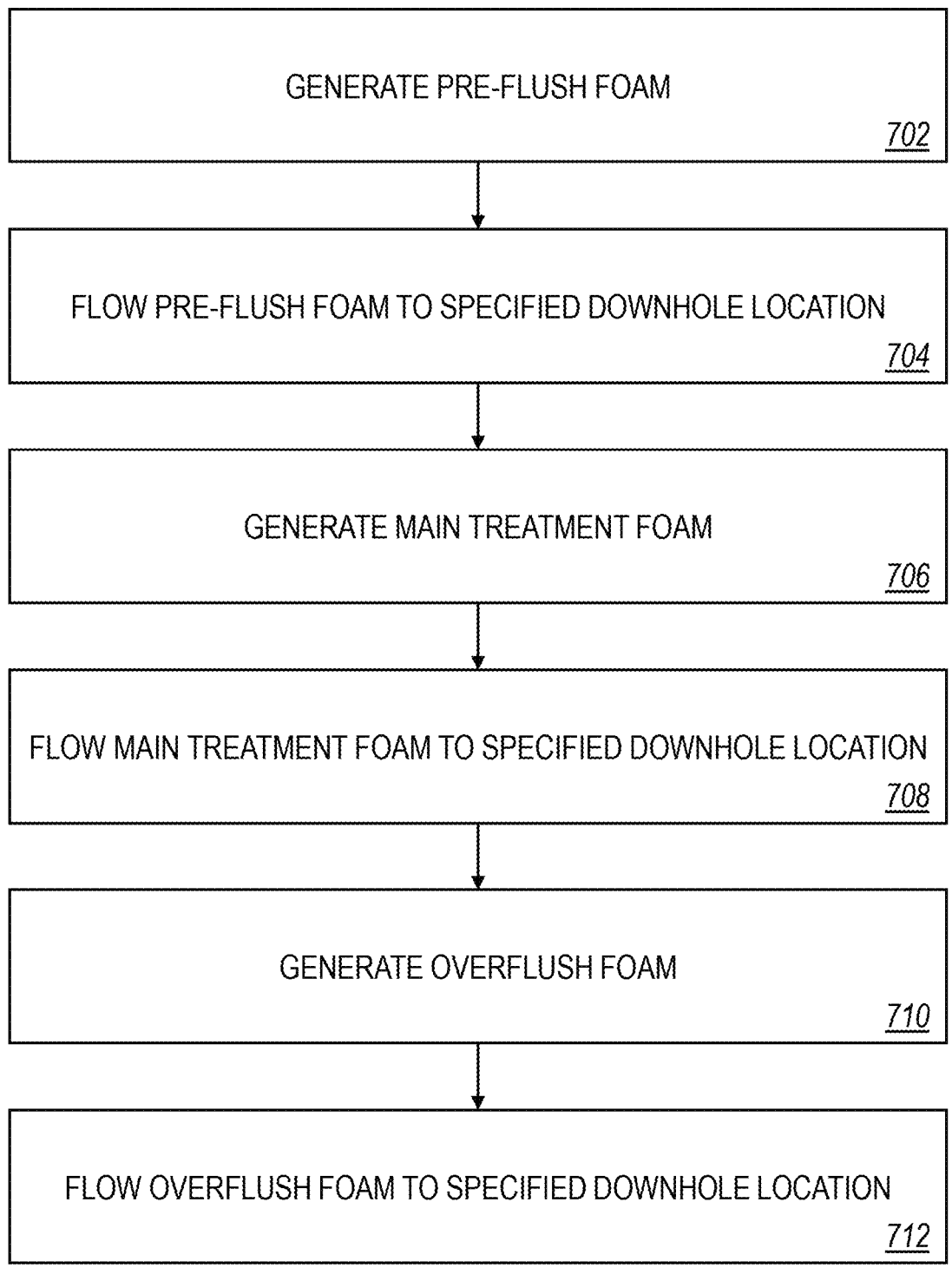
FIG. 7 is a flow chart of an example method for treating a subterranean formation.

FIG. 7 is a flow chart of an example method 700 for treating a subterranean formation to protect against solid deposition and corrosion attack. The method 700 can, for example, be implemented in the well 100 shown in FIG. 1. At block 702, a pre-flush foam (such as the pre-flush foam 120) is generated at a subsurface level (for example, within the wellbore of the well 100). As described previously, the pre-flush foam 120 includes a first aqueous liquid and a first gas, and the pre-flush foam 120 is shear thinning and non-Newtonian. At block 704, the pre-flush foam 120 is flowed to a specified downhole location (treatment zone) within the subterranean formation. At block 706, a main treatment foam (such as the main treatment foam 122) is generated at a subsurface level (for example, within the wellbore of the well 100). As described previously, the main treatment foam 122 includes a second aqueous liquid (including a scale inhibitor) and a second gas, and the main treatment foam 122 is shear thinning and non-Newtonian. At block 708, the main treatment foam 122 is flowed to the specified downhole location (treatment zone) within the subterranean formation. At block 710, an overflush foam (such as the overflush foam 124) is generated at a subsurface level (for example, within the wellbore of the well 100). As described previously, the overflush foam 124 includes a third aqueous liquid and a third gas, and the overflush foam 124 is shear thinning and non-Newtonian. At block 712, the overflush foam 124 is flowed to the specified downhole location (treatment zone) within the subterranean formation.

EMBODIMENTS

In an example implementation (or aspect), a method of treating a subterranean formation to protect against solid deposition and corrosion attack includes: flowing a first aqueous fluid as a pre-flush into a wellbore formed in the subterranean formation via a tubing installed in the wellbore; while flowing the first aqueous fluid, flowing a first gas together with the first aqueous fluid into the wellbore via the tubing, wherein flowing the first gas together with the first aqueous fluid via the tubing produces turbulent flow of the first gas and the first aqueous fluid within the tubing, thereby generating a pre-flush foam that is shear thinning and non-Newtonian and flows to a specified downhole location within the subterranean formation; after flowing the pre-flush foam to the specified downhole location, flowing a second aqueous fluid as a main treatment pill into the wellbore via the tubing; while flowing the second aqueous fluid, flowing a second gas together with the second aqueous fluid into the wellbore via the tubing, wherein flowing the second gas together with the second aqueous fluid via the tubing produces turbulent flow of the second gas and the second aqueous fluid within the tubing, thereby generating a main treatment foam that is shear thinning and non-Newtonian and flows to the specified downhole location, wherein the second aqueous fluid comprises a scale inhibitor configured to inhibit formation of scale within the subterranean formation; after flowing the main treatment foam to the specified downhole location, flowing a third aqueous fluid as an overflush into the wellbore via the tubing; and while flowing the third aqueous fluid, flowing a third gas together with the third aqueous fluid into the wellbore, via the tubing, wherein flowing the third gas together with the third aqueous fluid via the tubing produces turbulent flow of the third gas and the third aqueous fluid within the tubing, thereby generating an overflush foam that is shear thinning and non-Newtonian and flows to the specified downhole location.

In an example implementation (or aspect) combinable with any other example implementation (or aspect), the first gas, the second gas, and the third gas each comprise nitrogen, carbon dioxide, or both.

In an example implementation (or aspect) combinable with any other example implementation (or aspect), the first aqueous fluid, the second aqueous fluid, and the third aqueous fluid each comprise a foaming agent comprising sodium alpha olefin sulfonate, ethoxylated alcohol ammonium sulfate, sodium dodecylbenzene sulfonate, sodium dioctyl sulfosuccinate, sodium dodecylaminodipropionate, sodium lauryl sulfoacetate, hexadecyltrimethyl ammonium chloride, polyethoxylated nonyl phenol, alkyl polyglycoside, cocoamidopropyl betaine, sodium perfluoroalkyl sulfonate, cocoamidopropyl hydroxysultaine, or any combinations thereof.

In an example implementation (or aspect) combinable with any other example implementation (or aspect), the pre-flush foam, the main treatment foam, and the overflush foam each have foam qualities in a range of from about 25% to about 80% at ambient conditions.

In an example implementation (or aspect) combinable with any other example implementation (or aspect), the pre-flush foam, the main treatment foam, and the overflush foam each have foam qualities in a range of from about 50% to about 75% at ambient conditions.

In an example implementation (or aspect) combinable with any other example implementation (or aspect), the first aqueous fluid comprises the scale inhibitor at a concentration in a range of from about 500 parts per million (ppm) to about 2,000 ppm, and a concentration of the foaming agent in the first aqueous fluid is in a range of from about 0.5 volume percent (vol. %) to about 2 vol. %.

In an example implementation (or aspect) combinable with any other example implementation (or aspect), the first aqueous fluid comprises a mutual solvent that is soluble in water and in oil, and a concentration of the mutual solvent in the first aqueous fluid is in a range of from about 5 vol. % to about 10 vol. %.

In an example implementation (or aspect) combinable with any other example implementation (or aspect), the third aqueous fluid comprises salt, and a total dissolved solids (TDS) concentration in the third aqueous fluid is in a range of from about 1,000 ppm to about 12,000 ppm.

In an example implementation (or aspect) combinable with any other example implementation (or aspect), a concentration of the foaming agent in the second aqueous fluid is in a range of from about 1 vol. % to about 50 vol. %.

In an example implementation (or aspect) combinable with any other example implementation (or aspect), the concentration of the foaming agent in the second aqueous fluid is in a range of from about 5 vol. % to about 15 vol. %.

In an example implementation (or aspect), a method of treating a subterranean formation to protect against solid deposition and corrosion attack includes: generating, at a subsurface level, a pre-flush foam comprising a first aqueous fluid and a first gas, wherein the pre-flush foam is shear thinning and non-Newtonian; flowing the pre-flush foam to a specified downhole location within the subterranean formation; generating, at the subsurface level, a main treatment foam comprising a second aqueous fluid and a second gas, wherein the second aqueous fluid comprises a scale inhibitor configured to inhibit formation of scale within the subterranean formation, wherein the main treatment foam is shear thinning and non-Newtonian; flowing the main treatment foam to the specified downhole location; generating, at the subsurface level, an overflush foam comprising a third aqueous fluid and a third gas, wherein the overflush foam is shear thinning and non-Newtonian; and flowing the overflush foam to the specified downhole location.

In an example implementation (or aspect) combinable with any other example implementation (or aspect), the first gas, the second gas, and the third gas each comprise nitrogen, carbon dioxide, or both.

In an example implementation (or aspect) combinable with any other example implementation (or aspect), the first aqueous fluid, the second aqueous fluid, and the third aqueous fluid each comprise a foaming agent comprising sodium alpha olefin sulfonate, ethoxylated alcohol ammonium sulfate, sodium dodecylbenzene sulfonate, sodium dioctyl sulfosuccinate, sodium dodecylaminodipropionate, sodium lauryl sulfoacetate, hexadecyltrimethyl ammonium chloride, polyethoxylated nonyl phenol, alkyl polyglycoside, cocoamidopropyl betaine, sodium perfluoroalkyl sulfonate, cocoamidopropyl hydroxysultaine, or any combinations thereof.

In an example implementation (or aspect) combinable with any other example implementation (or aspect), the pre-flush foam, the main treatment foam, and the overflush foam each have foam qualities in a range of from about 25% to about 80% at ambient conditions.

In an example implementation (or aspect) combinable with any other example implementation (or aspect), the pre-flush foam, the main treatment foam, and the overflush foam each have foam qualities in a range of from about 50% to about 75% at ambient conditions.

In an example implementation (or aspect) combinable with any other example implementation (or aspect), the first aqueous fluid comprises the scale inhibitor at a concentration in a range of from about 500 parts per million (ppm) to about 2,000 ppm, and a concentration of the foaming agent in the first aqueous fluid is in a range of from about 0.5 volume percent (vol. %) to about 2 vol. %.

In an example implementation (or aspect) combinable with any other example implementation (or aspect), the first aqueous fluid comprises a mutual solvent that is soluble in water and in oil, and a concentration of the mutual solvent in the first aqueous fluid is in a range of from about 5 vol. % to about 10 vol. %.

In an example implementation (or aspect) combinable with any other example implementation (or aspect), the third aqueous fluid comprises salt, and a total dissolved solids (TDS) concentration in the third aqueous fluid is in a range of from about 1,000 ppm to about 12,000 ppm.

In an example implementation (or aspect) combinable with any other example implementation (or aspect), a concentration of the foaming agent in the second aqueous fluid is in a range of from about 1 vol. % to about 50 vol. %.

In an example implementation (or aspect), a method of treating a subterranean formation to protect against solid deposition and corrosion attack includes: flowing a pre-flush fluid to a specified downhole location within the subterranean formation; flowing a main treatment fluid to the specified downhole location, wherein the main treatment fluid comprises a scale inhibitor configured to inhibit formation of scale within the subterranean formation; generating, at a subsurface level, an overflush foam comprising an aqueous fluid and a gas, wherein the overflush foam is shear thinning and non-Newtonian; and flowing the overflush foam to the specified downhole location.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method of treating a subterranean formation to protect against solid deposition and corrosion attack, the method comprising:
   flowing a first aqueous fluid as a pre-flush into a wellbore formed in the subterranean formation via a tubing installed in the wellbore;
   while flowing the first aqueous fluid, flowing a first gas together with the first aqueous fluid into the wellbore via the tubing, wherein flowing the first gas together with the first aqueous fluid via the tubing produces turbulent flow of the first gas and the first aqueous fluid within the tubing, thereby generating a pre-flush foam that is shear thinning and non-Newtonian and flows to a specified downhole location within the subterranean formation;
   after flowing the pre-flush foam to the specified downhole location, flowing a second aqueous fluid as a main treatment pill into the wellbore via the tubing;

while flowing the second aqueous fluid, flowing a second gas together with the second aqueous fluid into the wellbore via the tubing, wherein flowing the second gas together with the second aqueous fluid via the tubing produces turbulent flow of the second gas and the second aqueous fluid within the tubing, thereby generating a main treatment foam that is shear thinning and non-Newtonian and flows to the specified downhole location, wherein the second aqueous fluid comprises a scale inhibitor configured to inhibit formation of scale within the subterranean formation;

after flowing the main treatment foam to the specified downhole location, flowing a third aqueous fluid as an overflush into the wellbore via the tubing; and while flowing the third aqueous fluid, flowing a third gas together with the third aqueous fluid into the wellbore, via the tubing, wherein flowing the third gas together with the third aqueous fluid via the tubing produces turbulent flow of the third gas and the third aqueous fluid within the tubing, thereby generating an overflush foam that is shear thinning and non-Newtonian and flows to the specified downhole location.

2. The method of claim 1, wherein the first gas, the second gas, and the third gas each comprise nitrogen, carbon dioxide, or both.

3. The method of claim 2, wherein the first aqueous fluid, the second aqueous fluid, and the third aqueous fluid each comprise a foaming agent comprising sodium alpha olefin sulfonate, ethoxylated alcohol ammonium sulfate, sodium dodecylbenzene sulfonate, sodium dioctyl sulfosuccinate, sodium dodecylaminodipropionate, sodium lauryl sulfoacetate, hexadecyltrimethyl ammonium chloride, polyethoxylated nonyl phenol, alkyl polyglycoside, cocoamidopropyl betaine, sodium perfluoroalkyl sulfonate, cocoamidopropyl hydroxysultaine, or any combinations thereof.

4. The method of claim 3, wherein the pre-flush foam, the main treatment foam, and the overflush foam each have foam qualities in a range of from about 25% to about 80% at ambient conditions.

5. The method of claim 4, wherein the pre-flush foam, the main treatment foam, and the overflush foam each have foam qualities in a range of from about 50% to about 75% at ambient conditions.

6. The method of claim 4, wherein the first aqueous fluid comprises a scale inhibitor at a concentration in a range of from about 500 parts per million (ppm) to about 2,000 ppm, the scale inhibitor of the first aqueous fluid is the same as the scale inhibitor of the second aqueous fluid, and a concentration of the foaming agent in the first aqueous fluid is in a range of from about 0.5 volume percent (vol. %) to about 2 vol. %.

7. The method of claim 4, wherein the first aqueous fluid comprises a mutual solvent that is soluble in water and in oil, and a concentration of the mutual solvent in the first aqueous fluid is in a range of from about 5 vol. % to about 10 vol. %.

8. The method of claim 4, wherein the third aqueous fluid comprises salt, and a total dissolved solids (TDS) concentration in the third aqueous fluid is in a range of from about 1,000 ppm to about 12,000 ppm.

9. The method of claim 4, wherein a concentration of the foaming agent in the second aqueous fluid is in a range of from about 1 vol. % to about 50 vol. %.

10. The method of claim 9, wherein the concentration of the foaming agent in the second aqueous fluid is in a range of from about 5 vol. % to about 15 vol. %.

11. A method of treating a subterranean formation to protect against solid deposition and corrosion attack, the method comprising:
generating, at a subsurface level, a pre-flush foam comprising a first aqueous fluid and a first gas, wherein the pre-flush foam is shear thinning and non-Newtonian;
flowing the pre-flush foam to a specified downhole location via a tubing within the subterranean formation;
flowing a second aqueous fluid and a second gas together through the tubing at turbulent flow to the specified downhole location, thereby generating a main treatment foam that is shear thinning and non-Newtonian and flows to the specified downhole location, wherein the second aqueous fluid comprises a scale inhibitor configured to inhibit formation of scale within the subterranean formation; and
flowing a third aqueous fluid and a third gas together through the tubing at turbulent flow to the specified downhole location, thereby generating an overflush foam that is shear thinning and non-Newtonian and flows to the specified downhole location.

12. The method of claim 11, wherein the first gas, the second gas, and the third gas each comprise nitrogen, carbon dioxide, or both.

13. The method of claim 12, wherein the first aqueous fluid, the second aqueous fluid, and the third aqueous fluid each comprise a foaming agent comprising sodium alpha olefin sulfonate, ethoxylated alcohol ammonium sulfate, sodium dodecylbenzene sulfonate, sodium dioctyl sulfosuccinate, sodium dodecylaminodipropionate, sodium lauryl sulfoacetate, hexadecyltrimethyl ammonium chloride, polyethoxylated nonyl phenol, alkyl polyglycoside, cocoamidopropyl betaine, sodium perfluoroalkyl sulfonate, cocoamidopropyl hydroxysultaine, or any combinations thereof.

14. The method of claim 13, wherein the pre-flush foam, the main treatment foam, and the overflush foam each have foam qualities in a range of from about 25% to about 80% at ambient conditions.

15. The method of claim 14, wherein the pre-flush foam, the main treatment foam, and the overflush foam each have foam qualities in a range of from about 50% to about 75% at ambient conditions.

16. The method of claim 14, wherein the first aqueous fluid comprises a scale inhibitor at a concentration in a range of from about 500 parts per million (ppm) to about 2,000 ppm, the scale inhibitor of the first aqueous fluid is the same as the scale inhibitor of the second aqueous fluid, and a concentration of the foaming agent in the first aqueous fluid is in a range of from about 0.5 volume percent (vol. %) to about 2 vol. %.

17. The method of claim 14, wherein the first aqueous fluid comprises a mutual solvent that is soluble in water and in oil, and a concentration of the mutual solvent in the first aqueous fluid is in a range of from about 5 vol. % to about 10 vol. %.

18. The method of claim 14, wherein the third aqueous fluid comprises salt, and a total dissolved solids (TDS) concentration in the third aqueous fluid is in a range of from about 1,000 ppm to about 12,000 ppm.

19. The method of claim 14, wherein a concentration of the foaming agent in the second aqueous fluid is in a range of from about 1 vol. % to about 50 vol. %.

20. A method of treating a subterranean formation to protect against solid deposition and corrosion attack, the method comprising:
flowing a pre-flush fluid to a specified downhole location within the subterranean formation;

flowing a main treatment treatment fluid to the specified downhole location, wherein the main treatment fluid comprises a scale inhibitor configured to inhibit formation of scale within the subterranean formation; and flowing an aqueous fluid and a gas together at turbulent flow to the specified downhole location, thereby generating an overflush foam that is shear thinning and non-Newtonian and flows to the specified downhole location.

* * * * *